United States Patent
Zhang et al.

(10) Patent No.: US 9,239,668 B2
(45) Date of Patent: Jan. 19, 2016

(54) PROVISION OF A USER INTERFACE BASED ON USER INTERACTION WITH A COMPUTING DEVICE

(75) Inventors: Qiang Zhang, Shanghai (CN); Junmin Zhu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 225 days.

(21) Appl. No.: 13/996,488

(22) PCT Filed: Jun. 29, 2012

(86) PCT No.: PCT/CN2012/077851
§ 371 (c)(1),
(2), (4) Date: Jun. 20, 2013

(87) PCT Pub. No.: WO2014/000250
PCT Pub. Date: Jan. 3, 2014

(65) Prior Publication Data
US 2014/0229848 A1    Aug. 14, 2014

(51) Int. Cl.
G06F 3/00 (2006.01)
G06F 3/033 (2013.01)
(Continued)

(52) U.S. Cl.
CPC ............ *G06F 3/0484* (2013.01); *G06F 3/0488* (2013.01); *G06F 9/4443* (2013.01); *H04L 67/22* (2013.01)

(58) Field of Classification Search
None
See application file for complete search history.

(56) References Cited

U.S. PATENT DOCUMENTS 7,352,359 B2 * 4/2008 Zalewski ................ A63F 13/02
345/2
8,209,628 B1 * 6/2012 Davidson .............. G06F 3/0487
715/790

(Continued)

FOREIGN PATENT DOCUMENTS

| CN | 101820350 A | 9/2010 |
| CN | 102354285 A | 2/2012 |

OTHER PUBLICATIONS

International Search Report and Written Opinion mailed Apr. 4, 2013 for International Application No. PCT/CN2012/077851, 12 pages.
(Continued)

*Primary Examiner* — Stephen Alvesteffer
(74) *Attorney, Agent, or Firm* — Schwabe, Williamson & Wyatt, P.C.

(57) ABSTRACT

Servers, storage medium and methods associated with provision of user interface on a computing device are disclosed herein. In embodiments, a storage medium may have instructions to enable the computing device to monitor interactions with the first computing device by a user of the first computing device. The instructions may enable the first computing device to upload detected interactions or characteristic data of the interactions to a remote computing service to enable accumulation of the characteristic data of the interactions or generation of customizable user interface settings at the remote computing service. The instructions may enable the first computing device to subsequently download of the accumulated characteristic data of the interactions or customizable user interface settings to a second computing device associated with the user, for use to facilitate provision of a user interface on the second computing device, based at least in part on downloaded characteristic data of the interactions or customizable user interface settings. Other embodiments may be disclosed or claimed.

22 Claims, 5 Drawing Sheets

(51) Int. Cl.
  *G06F 3/0484* (2013.01)
  *G06F 3/0488* (2013.01)
  *H04L 29/08* (2006.01)
  *G06F 9/44* (2006.01)

(56) References Cited

U.S. PATENT DOCUMENTS 8,760,426 B1 * 6/2014 Strand et al. .................. 345/173
8,856,670 B1 * 10/2014 Thakur et al. ................ 715/765
2002/0087289 A1 * 7/2002 Halabieh ............... G06F 9/4443
　　　　　　　　　　　　　　　　　　　　　　702/181
2004/0034646 A1 * 2/2004 Kimball et al. ................ 707/102
2006/0112073 A1 * 5/2006 Jensen et al. ..................... 707/2
2008/0284751 A1 * 11/2008 Hsu et al. ....................... 345/173
2009/0089718 A1　　 4/2009 Pompilio et al.
2010/0279674 A1　　 11/2010 Zou et al.

OTHER PUBLICATIONS

International Preliminary Report on Patentability mailed Jan. 8, 2015 for International Application No. PCT/CN2012/077851, 7 pages.

* cited by examiner

PROVISION OF A USER INTERFACE BASED ON USER INTERACTION WITH A COMPUTING DEVICE

CROSS REFERENCE TO RELATED APPLICATIONS

The present application is a national phase entry under 35 U.S.C. §371 of International Application No. PCT/CN2012/077851, filed Jun. 29, 2012, entitled "PROVISION OF A USER INTERFACE BASED ON USER INTERACTION WITH A COMPUTING DEVICE, which designated, among the various States, the United States of America. The Specification of the PCT/CN2012/077851 Application is hereby incorporated by reference.

TECHNICAL FIELD

This application relates to the technical field of data processing, more specifically to methods and apparatuses associated with provisioning a user interface based on user interaction with a computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In general, users are not satisfied by the user experience (known as UX) and user interfaces (known as UI) that are demonstrated by web applications today. Many users want to customize web applications according to their individual needs and habits. User preferences would typically include specific and friendly user interfaces. Users are generally familiar with applications which run on different Operation Systems (OS) as native applications. These applications will typically be deployed to different touch devices, however, due to natural limitations of layout design and missing differentiation of user touch input, such as different touch habit, different fingers etc., it may be difficult to customize an application's layout for each individual. Users of an application therefore work with the same layout and same usage model on different devices.

To solve the native application layout issues on different devices, developers typically have to prepare and build up a variety of themes to make native applications adjust to different devices and usage scenarios. Such applications load different icons and widgets On different windows and screen sizes. These applications may be built with specific sources and components on different target device. Developers use the relative position and percentage sizing in layout to improve UI adjustment to the target devices. However, for web applications, it may be difficult to match an application to a variety of client devices, so developers have to keep tuning the applications in order to refine the UI as they do on native applications.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

As HTML5 increasingly evolves and is adopted as an industry standard for cross device development, web applications are becoming more popular for mobile devices and it appears that web application hosts (Web Runtime or Browser) may lead a revolution of mobile internet as the next primary application development platform. Web applications, in general, may be more focused on individuation, and there appears to be a strong trend following individuation through personal computer customization in the last decade. (HTML Hypertext Markup Language.)

Figure 1:
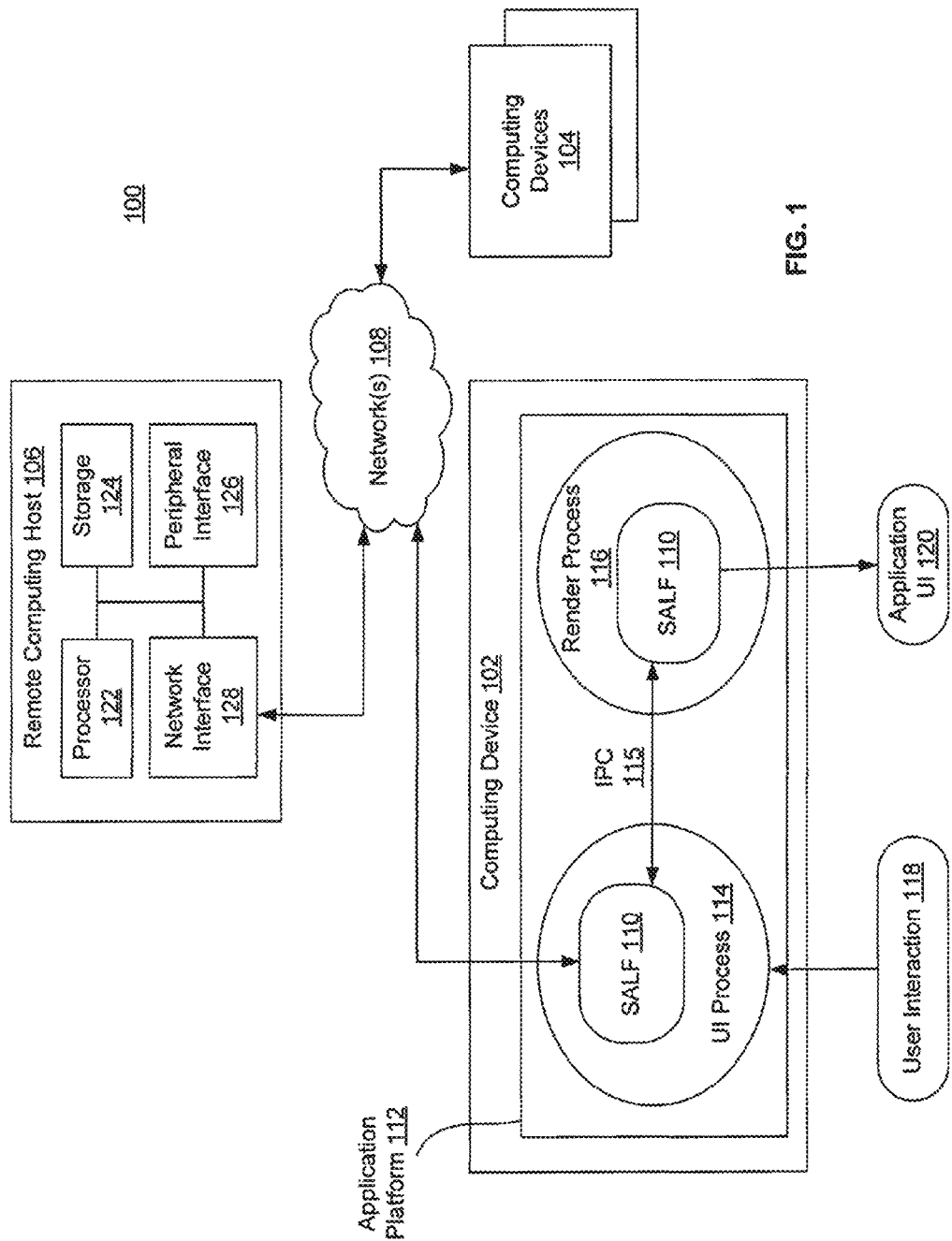
FIG. 1 illustrates an arrangement configured to enable a computing device to provision a user interface based on user input.

FIG. 1 illustrates an arrangement 100 configured to enable a computing device to monitor interactions of a user and use services of a remote computing host, e.g., a cloud server, to customize and provision a user interface of one or more computing devices based on the monitored interactions, in accordance with various embodiments. Remote computing devices may be referred to by those skilled in the art as cloud computing devices, cloud servers, and variants of the like.

Thus, remote computing device and cloud server or cloud computing device and other variants are meant to be synonymous, unless the context clearly indicates otherwise. As shown, arrangement 100 may include a computing device 102, computing devices 104, and a remote computing host 106, all coupled together via network(s) 108. According to various embodiments, computing device 102 may be configured to monitor interactions of a user with computing device 102. For example computing device 102 may be configured to monitor the speed and/or pressure with which the user touches an interactive display of one or more applications and/or system services of computing device 102. Additionally, computing device 102 may monitor the speed with which a user selects one input after another for the applications/system services on computing device 102. Furthermore, computing device 102 may monitor the angle or angles at which the user holds and/or orients computing device 102 during use of the various applications/system services (hereinafter, simply "applications."). Computing device 102 may be configured to upload the monitored data of the user's input habits specific to, or across, the various applications to remote computing host 106. In embodiments, computing device 102 may initially process the monitored data to generate derived characteristic data, e.g., to reduce the volume of data that has to be uploaded. For these embodiments, computing device 102 may then be configured to upload the characteristics data to remote computing host 106 instead. In still other embodiments, computing device 102 may process some of the monitored data, and upload some of the monitored data unprocessed, and upload other of the monitored data in the form of processed characteristic data.

Remote computing host 106 may be configured to accumulate, store, and/or analyze the various habits or interactions of the user based on the monitored or characteristics data received from computing device 102 and other similarly configured computing devices of the user (including but not limited to computing devices 104). In embodiments, remote computing host 106 may be further configured to determine customizable settings which may be applied to a variety of other applications and/or computing devices to personalize the user's experience or to enhance the user's experience of one or more applications executed on one or more computing devices 102/104.

Computing device 102, depending on embodiments, may then be configured to download or receive accumulated characteristic data and/or customizable settings from remote computing host 106 via network(s) 108 to display the application user interface (UI) and UI elements in a manner that may correlate with preferences of the user. Advantageously, these user preferences may be automatically ascertained or determined based on normal use of computing device 102 (and/or one or more computing devices 104) by the user. Additionally, computing devices 104 may likewise be configured to download the accumulated characteristic data and/or customizable settings from remote computing host 106 to enhance the user's experience on computing devices 104 based on the interactions of the user with computing device 102 (and/or one or more of computing devices 104). According to various embodiments, computing device 102 and computing devices 104 may be different devices, such as smart phones, personal digital assistants, electronic reading devices, tablet computing devices, tablet computers, desktops, kiosks, interactive televisions, monitors, and/or the like.

In various embodiments, computing device 102 may be configured to personalize and/or customize the application UI based on a self adaptive layout framework (SALF) 110. The SALF 110 may be executed and/or called by one or more processes of an application platform 112. The term 'application platform' as used herein, in general, refers to a collection of hardware and/or software components of a computing device that enable applications (e.g., their processes) to execute on the computing device. According to various embodiments, application platform 112 may include a browser, a WebRuntime, a hypertext transfer protocol (http) server, an OS, device drivers, and so forth. In embodiments, application platform 112 may include a UI process 114 and a render process 116 that communicates with UI process 114 via, e.g., inter-process communications (IPC) 115. In embodiments, UI process 114 and render process 116 may be configured to monitor user interactions, process the monitored interactions into characteristics data, and provide or provision customize settings to an application UI for output to a display of computing device 102.

In various embodiments, SALF 110 may include a listener function, a processor function, and a provider function. The listener function of SALF 110 may be configured to enable computing device 102 to monitor a user interaction 118. As was discussed above, user interaction 118 may include the orientation with which a user handles computing device 102, may include the speed and/or pressure with which the user selects UI elements of applications, and may include the area consumed on an interactive display by each tactile interaction the user has with applications of computing device 102 (hereinafter, simply "computing device 102"). According to embodiments, UI elements may be graphical user inputs, such as buttons, slides, check boxes, or the like of computing device 102. As will be discussed later, according to various embodiments, the area consumed on interactive display by each tactile interaction of the user may be used to determine a finger size of the user.

The processor function of SALF 110 may be configured to format the data gathered by the listener function, in preparation for transmission to remote computing host 106 over network(s) 108. The processor function may be launched during initialization of the application platform 112. The processor function may be further configured to analyze raw user interaction data according to habit patterns and then generate habit and touch properties and extrapolated preferences. Thereafter, the processor function may upload the generated properties and extrapolated preferences to remote computing host 106. In alternate embodiments, the processor function may upload the raw data to enable the remote computing host to generate the properties and extrapolate the preferences. In still other embodiments, the processor function may upload some raw data, but process others, and upload generated properties and extrapolated preferences for the processed data.

In various embodiments, the provider function of SALF 110 may be further configured to download accumulated characteristics data and/or customizable settings from remote computing host 106 and determine hardware capabilities of computing device 102. Provider function may also be configured to fetch characteristics data and/or customizable settings for render process 116 and use the fetched data to support execution of 120 of an application. According to embodiments, examples of applications that may be executed by application platform 112 include video streaming, webpages, and other graphical user interface-based applications.

In various embodiments, computing devices 104 may be configured to execute SALF 110 in a manner similar to computing device 102. In other words, computing devices 104 may also be configured to monitor user interaction 118, transmit raw data or derived characteristics data that are representative of user interactions 118 to remote computing host 106, and fetch accumulated characteristics data and/or customizable settings from remote computing host 106. Computing devices 104 may be configured to apply the fetched characteristics data and/or customizable settings to provide and/or display UI 120 of an application that includes personalized layout of UI elements. According to various embodiments, each of computing devices 104 may include tactile-responsive and/or interactive displays or other sensors from which user interaction 118 may be collected.

In various embodiments, remote computing host 106 may be a cloud-based server configured to receive, store, analyze and derive characteristics data, i.e., data related to monitored user interactions 118, acquired by computing device 102 and/or computing devices 104. Remote computing host 106 may include a processor 122, storage 124, peripheral interface 126, and a network interface 128. In alternate embodiments, remote computing host 106 may include more or less components.

Processor 122 may be configured to process raw data and/or derived characteristics data received. Processor 122 may be further configured to generate characteristics data from received raw data. Processor 122 may also be configured to determine a variety of customized settings for user interfaces based on user interactions 118 received by computing device 102. Processor 122 may determine the customized settings by executing one or more instructions stored on storage 124. Processor 122 may be any one of a number of single or multi-core processors.

Storage 124 may be volatile memory, non-volatile memory, and/or a combination of volatile memory and non-volatile memory. Storage 124 may also include optical, electro-magnetic and/or solid state storage. Storage 124 may store a plurality of instructions which, when executed, may cause processor 124 to receive and/or process raw and/or characteristics data analyze the raw characteristics data, and provide personalized UI settings to computing devices 102 and 104 via network(s) 108.

Peripheral interface 126 may enable a variety of user interfaces, such as mice, keyboards, monitors, and/or audio commands. For example, peripheral interface 126 may enable USB ports, PS/2 ports, Firewire® ports, Bluetooth®, and the like, according to various embodiments.

Network interface 128 may be configured to couple remote computing device 106 to computing devices 102 and 104, via network(s) 108. Network interface 128 may be a wireless local area network interface, such as a WiFi® interface in compliance with one of the IEEE 802.11 standards. (IEEE=Institute of Electrical and Electronics Engineers.) Network interface 128 may include a wireless wide area network interface, such as 3G or 4G telecommunication interface. (3G and 4G refer to the $3^{rd}$ and $4^{th}$ Generation of Mobil Telecommunication Standards as defined by International Telecommunication Union.)

Figure 2:
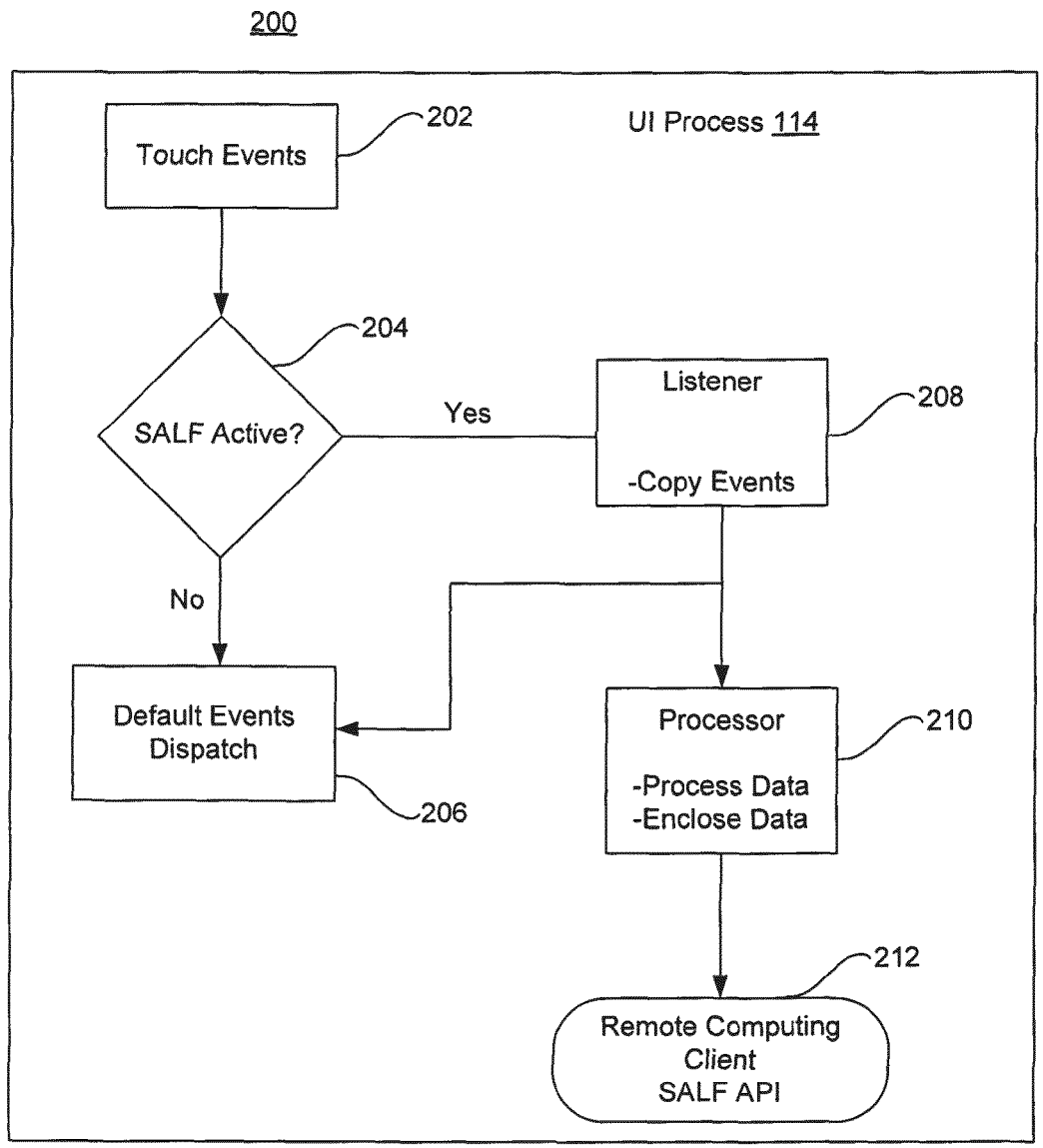
FIG. 2 illustrates a method of collecting user input.

FIG. 2 illustrates a method 200 of collection of SALF data, according to various embodiments. In particular, method 200 may illustrate various operations of SALF 110 within UI process 114.

At block 202, UI process 114 may receive notifications of one or more touch events. As discussed and described above, touch events may be detected by device drivers associated with a tactile-responsive interactive display, such as a capacitive, resistive, and/or acoustic touch screen.

At block 204, UI process 114 may determine whether SALF 110 is active. UI process 114 may determine that SALF 110 is active if application platform 112 is initialized on computing device 102. According to other embodiments, SALF 110 may be determined to be active if computing device 102 has established a network connection to remote computing host 106.

In embodiments, if UI process 114 determines that SALF 110 is not active, at block 206, UI process 114 may dispatch events in a default manner. In other words, UI process 114 may respond to the user interactions or touch events of block 202. For example, if the user has pressed a UI element, such as an "OKAY" button, at block 206, UI process 114 may invoke and transfer execution control to a function associated with the UI element that was selected.

If UI process 114 determines hat SALF 110 is active at block 204, at block 208 the listener function of SALF 110 may monitor, e.g., copy and/or store, the touch events of block 202. According to various embodiments, the listener function may be a daemon that runs as a background process and launched on initialization of application platform 112. After the listener function copies the events of block 202, UI process 114 may proceed to block 206 to respond to the touch events of block 202 and may proceed to block 210.

At block 210, processor function of SALF 110 may process the data received by the listener function by converting various touch events into characteristics data. In other words, the processor function may organize and prepare various types of data collected by listener function that are related to the touch events of block 202. The processor function may then enclose the characteristics data by adding identification headers, network-related headers, and by otherwise preparing data to be transmitted over the network.

At block 212, the data acquired from touch events of block 202 may be associated with one or more SALF application programming interface (API) calls to which remote computing host 106 may be responsive. For example, UI process 114 may associate the data with a SALF API call that causes remote computing host 106 to accumulate and/or store the touch events data.

While method 200 has been described with respect to data associated with touch events, other data, such as orientation of computing devices, may also be monitored and processed.

Figure 3:
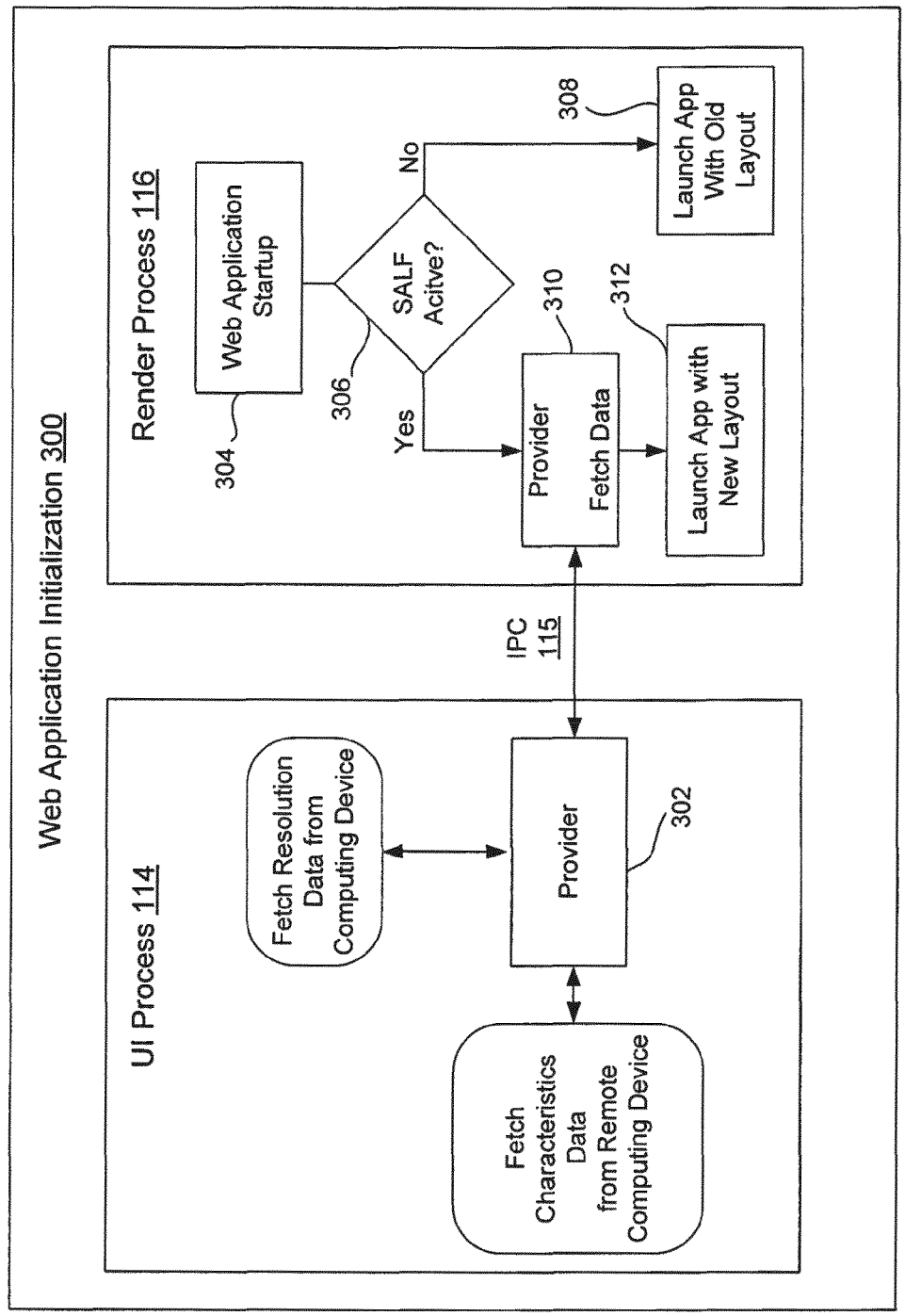
FIG. 3 illustrates a method of initializing an application.

FIG. 3 illustrates web application initialization 300, according to various embodiments. Web application initialization 300 may be performed by application platform 112 on computing device 102 and/or computing devices 104. Web application 300 may utilize both UI process 114 and render process 116. According to various embodiments, UI process 114 and render process 116 may function independent of one another, except for sharing data acquired by UI process 114.

At block 302, the provider function may fetch and prepare data for use by render process 116. For example, the provider function may fetch resolution data from computing device 102. Obtaining resolution data of computing device 102 enables render process 116 to selectively adjust the size of various UI elements and/or to adjust the locations of the UI elements. Alternatively or concurrently, the provider function may fetch characteristics data from remote computing host 106. According to various embodiments, if a network connection may not be established with remote computing host 106, the provider function may fetch characteristics data from one or more storage locations of a memory of computing device 102. The provider function may provide or make available the fetched resolution data and the fetched characteristics data to a portion of the provider function executing in render process 116.

Render process 116 may be configured to customize the UI layout of an application executed by application platform 112. At 304, the web application may be initialized or started. At 306, render process 116 may determine if SALF is active.

According to various embodiments, SALF may be determined to be not active if a network connection has not been established with remote computing host 106. If SALF is determined to be not active, render process 116 may proceed to block 308.

At block 308, render process 116 may launch the web application with an old layout. In other words, render process 116 may use settings, such as the size of UI elements and the proximity of UI elements to various edges of the monitor, from a previous session of the web application.

If render process 116 determines at block 306 that SALF is active, then render process 116 may proceed to block 310.

At block 310, the provider function may fetch data from UI process 114. The fetched data may include device resolution data, data related to which hand of the user is dominant (left/right), data related to how much pressure the interface display may receive before triggering a touch event, and the like.

At block 312, render process 116 may launch a web based application with a new layout. Render process 116 may be configured to determine characteristics of the new layout based on characteristics data and/or customizable settings that have been fetched from remote computing host 106. According to various embodiments, web application initialization 300 may occur on computing devices 104 which may have a different display resolution and/or a different display size. Render process 116 may be configured to take into account hardware-specific capabilities of the computing device 102 or computing devices 104 while launching the application with the new layout.

Various advantages may become available to a user of a computing device that executes web application initialization 300. For example, a parent may desire to use the same touch-screen device that a child uses. According to various embodiments, while the child is logged in to the touchscreen device, UI process 114 and render process 116 may display an application layout that is based on an accumulation of characteristics data that is particular to the child. For example, the child may be left-handed, have small fingers, and type relatively slowly without using a lot of pressure to interact with various UI elements, dialog buttons and/or checkboxes. However, when a parent or other person having different user habits logs in to the same computing device, UI process 114 and render process 116 may launch a web application with a new layout according to characteristics data collected from user habits of the parent/adult. This may provide a more personalized user experience. For example, if the parent has a larger finger area, render process 116 may generate UI elements having a larger area, enable the UI elements to be responsive to quicker tactile or touch events, and may orient user elements to one side of a display of the computing device based on a dominant hand of the parent, such as right-handedness. Advantageously, UI process 114 and render process 116 may be executed on a number of computing devices 102 and 104, so that user habits can be collected from more than one device and accumulated and analyzed at remote computing host 106 for later download and use.

Figure 4:
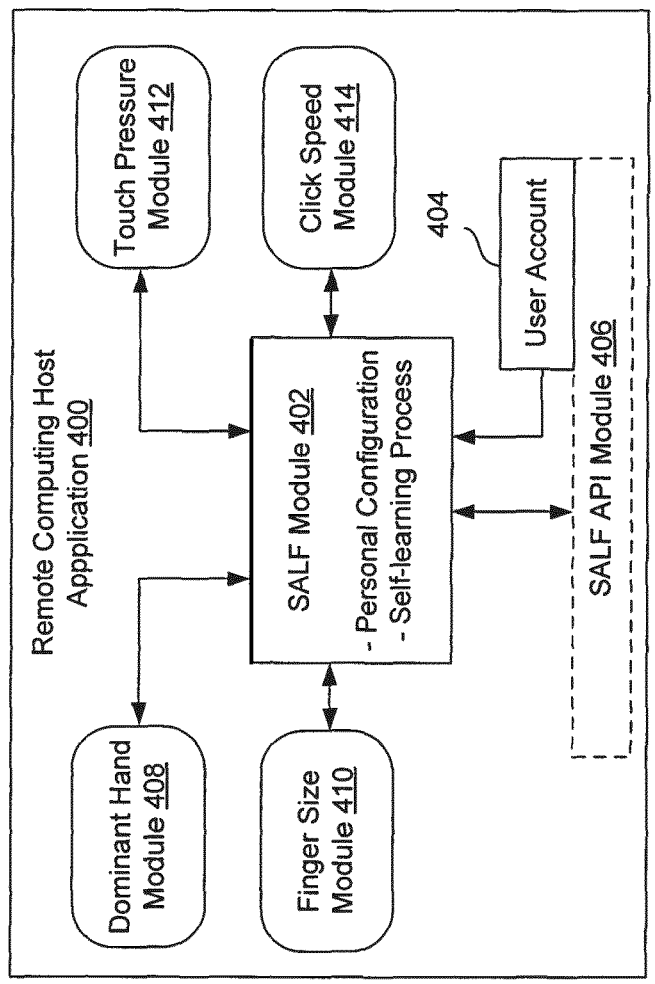
FIG. 4 illustrates a method of analyzing user data on a remote computing host.

FIG. 4 illustrates a remote computing host application 400 that may be executed on remote computing host 106, according to various embodiments of the disclosure. Remote computing host application 400 may include an SALF module 402. SALF module 402 may be configured to disperse received monitored or characteristic data to various other modules for further processing of a personal configuration. SALF module 402 may use accumulations of user monitored and characteristic data to determine and refine personalize settings for a particular user. SALF module 402 may be responsive to one or more specific user accounts 404. A user account may be selected based on information entered at computing device 102. SALF module 402 may receive instructions, commands, and/or queries from network(s) 108 through SALF API module 406. According to various embodiments, SALF API module 406 may define a set of calls and/or functions through which monitored and/or characteristics data are received from the network(s) 108 and transmitted to the network(s) 108.

SALF module 402 may interact with various other modules to analyze user information/habits based on monitored and/or characteristic data received from computing devices 102 and 104. For example, remote computing host application 400 may include a dominant hand module 408, a finger sized module 410, touch pressure module 412, and a click speed module 414. According to various embodiments, each of these modules may be configured to determine specific settings and/or adjustments to be made to personalize or accommodate habits of a user. For example, dominant hand module 408 may analyze various monitored/characteristics data to determine that a particular user is left-handed or right-handed. Based on the dominant hand determination, dominant hand module 408 may provide instructions to SALF module 402 to shift UI elements towards a dominant hand of the user, e.g., left.

Finger size module 410 may analyze monitored/characteristics data to determine an approximate area that is consumed on the interactive display while a user is touching a UI element. As discussed above, finger size module 410 may then indicate to SALF module 402 that UI elements may be enlarged or decreased to provide an improved and personalized UI experience.

Touch pressure module 412 and click speed module 414 may analyze monitored/characteristics data and determine speed and pressure thresholds that may be applied to computing devices 102, or 104 to improve and/or personalize the UI experience of the user.

Figure 5:
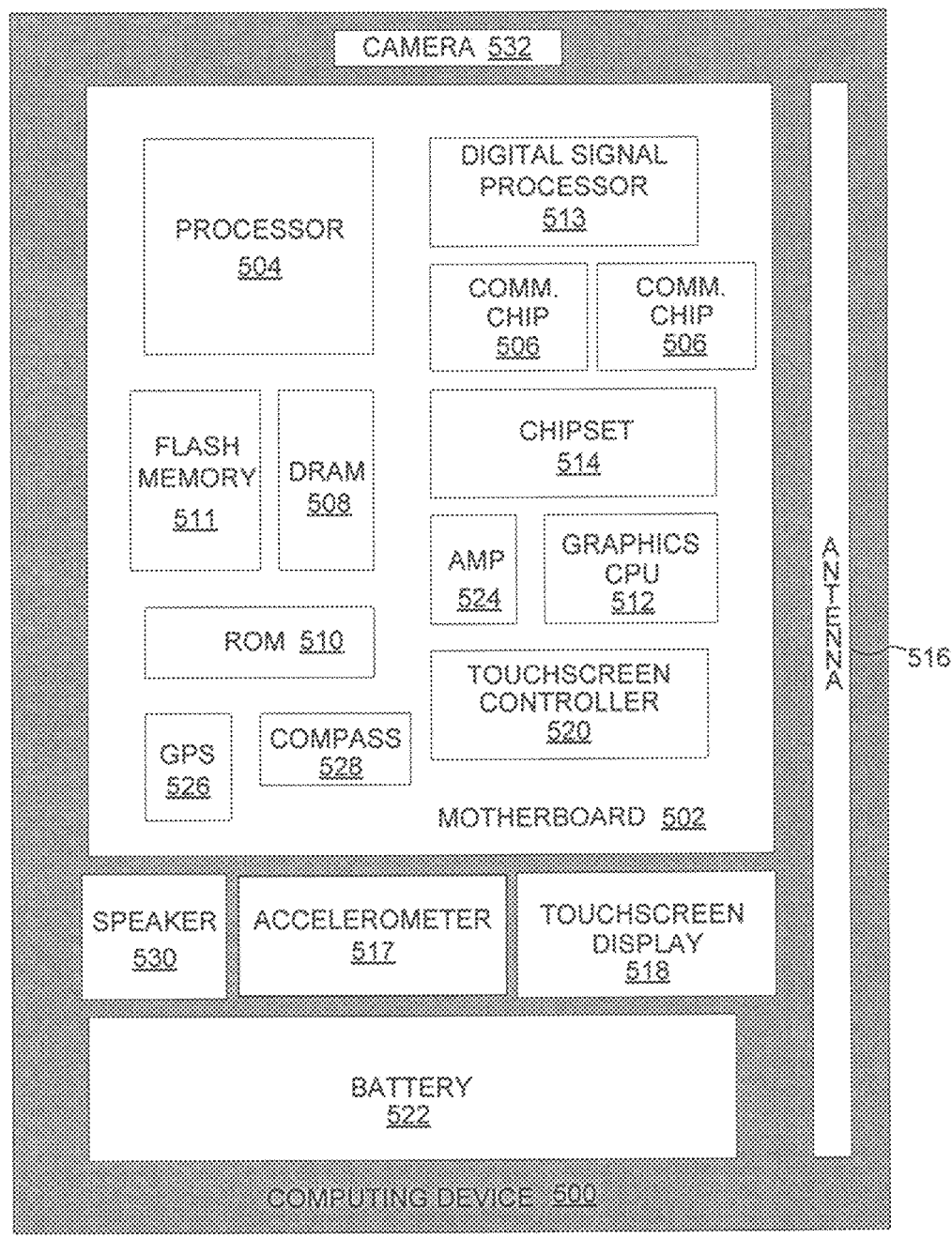
FIG. 5 illustrates an example of a computing device of FIG. 1; all arranged in accordance with embodiments of the present disclosure.

FIG. 5 illustrates a computing device 500 in accordance with one implementation of an embodiment of the invention. Depending on the actual components included, computing device 500 may be suitable for use as computing devices 102, 104 and/or 106 of FIG. 1. In embodiments, the computing device 500 may house a circuit board 502. The circuit board 502 may include a number of components, including but not limited to a processor 504 and at least one communication chip 506. The processor 504 may be physically and electrically coupled to the board 502. In some implementations the at least one communication chip 506 may also be physically and electrically coupled to the board 502. In further implementations, the communication chip 506 may be part of the processor 504. In alternate embodiments, the above enumerated may be coupled together in alternate manners without employment of circuit board 502.

Depending on its applications, computing device 500 may include other components that may or may not be physically and electrically coupled to the board 502. These other components include, but are not limited to, volatile memory (e.g., DRAM 508), non-volatile memory (e.g., ROM 510), flash memory 511, a graphics processor 512, a digital signal processor 513, a crypto processor (not shown), a chipset 514, an antenna 516, a display (not shown), a touchscreen display 518, a touchscreen controller 520, a battery 522, an audio codec (not shown), a video codec (not shown), a power amplifier 524, a global positioning system (GPS) device 526, a compass 528, an accelerometer, a gyroscope, a speaker 530, a camera 532, and a mass storage device such as hard disk drive, compact disk (CD), digital versatile disk (DVD), and so forth).

In various embodiments, volatile memory (e.g., DRAM 508), non-volatile memory (e.g., ROM 510), and/or flash memory 511, may include instructions to be executed by processor 504, graphics processor 512, digital signal processor 513, and/or crypto processor, to practice various aspects of the methods and apparatuses described earlier with references to FIGS. 1-4 on computing devices 102, 104 and/or 106.

The communication chip 506 may enable wired and/or wireless communications for the transfer of data to and from the computing device 500 through network(s) 108. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

The processor 504 of the computing device 500 may include an integrated circuit die packaged within the processor 504. The term "processor" may refer to any device or portion of a device (e.g., a processor core) that processes electronic data from registers and/or memory to transform that electronic data into other electronic data that may be stored in registers and/or memory.

The communication chip 506 also includes an integrated circuit die packaged within the communication chip 506.

In further implementations, another component housed within the computing device 500 may contain an integrated circuit die that includes one or more devices, such as processor cores, cache and one or more memory controllers.

In various implementations, the computing device 500 may be a laptop, a netbook, notebook, an ultrabook, a smartphone, a tablet, a personal digital assistant (PDA), an ultra mobile PC, a mobile phone, a desktop computer, a server, a printer, a scanner, a monitor, an entertainment control unit, a digital camera, a portable music player, or a digital video recorder. In further implementations, the computing device 500 may be any other electronic device that processes data.

In some embodiments, accelerometer 517 may enable SALF 110 to determine tilt, angle, and/or orientation data of computing devices 102 and 104.

According to various embodiments, at least one computer-readable storage medium may include a number of instructions stored therein and configured to enable a first computing device, in response to execution by the first computing device, to monitor interactions with the first computing device by a user of the first computing device. The instructions may be configured to enable the first computing device to upload detected interactions or characteristic data of the interactions to a remote computing service to enable accumulation of the characteristic data of the interactions at the remote computing service, and to enable subsequent download of the accumulated characteristic data of the interactions or customizable user interface settings to a second computing device associated with the user, for use to facilitate provision of a user interface on the second computing device, based at least in part on downloaded characteristic data of the interactions or customizable user interface settings. The customizable user interface settings may be derived from the accumulated characteristic data. The number of instructions may be further configured to enable the first computing device, in response to execution by the first computing device, to derive the characteristic data from the detected interactions.

In embodiments, enabling accumulation of the characteristic data of the interactions at the remote computing service may include enabling accumulation and merger of the characteristic data of the interactions at the remote computing service with characteristic data of other interactions of the user uploaded from other computing devices.

In embodiments, the number of instructions may be further configured to enable the first computing device, in response to execution by the first computing device, to download, from the remote computing service, merged characteristic data of interactions of the user; and provide a user interface on the first computing device, based at least in part on the merged characteristic data of interactions.

According to various embodiments, at least one computer readable storage medium may include a number of instructions stored therein and configured to enable a computing device, in response to execution by the computing device, to download, from a remote computing service, accumulated characteristic data of interactions of a user of the computing device or customizable user interface settings of the user, wherein the accumulated characteristic data of interactions are either uploaded from at least the computing device or derived from detected interactions uploaded from at least the computing device, and the customizable user interface settings are derived from the accumulated characteristic data. The instructions may be configured to enable the computing device to provide a user interface on the computing device, based at least in part on the characteristic data of interactions or customizable user interface settings downloaded from the remote computing service. The characteristic data of interactions downloaded from the remote computing service may include merged characteristic data of interactions of the computing device and at least one other computing device associated with the user.

According to various embodiments, at least one computer readable medium may include a number of instructions stored therein and configured to enable a mobile device, when executed by a processor of the mobile device, to execute a user interface process based on a self adaptive layout framework. The user interface process may be configured to monitor interactions of a user that are associated with the mobile device; upload the monitored interactions or characteristics data of the interactions to a remote server to enable accumulation of the characteristics data or generation of derived customizable user interface settings of the user; and retrieve, from the remote server, personalized user interface data that is based on the accumulation of the characteristics data or the customizable user interface settings. The number of instructions may be configured to enable the mobile device to execute a render process based on the self adaptive layout framework, wherein the render process is configured to display interactive elements of a user interface on the mobile device based on the personalized user interface data and based on display characteristics of the mobile device. The user interface process may be further configured to determine whether the self adaptive layout frame is active and monitor the user interactions based on whether the self adaptive layout frame is active.

In embodiments, the render process may be further configured to display the interactive elements of the user interface on the mobile device based on the retrieved personalized user interface data if the mobile device is connected to the remote server. The render process may be configured to display the interactive elements of the user interface on the mobile device based on stored user interface data located in memory of the mobile device if the mobile device is disconnected from the remote server. The characteristics data of the user interactions may include dominant hand of the user or finger size. Display characteristics of the mobile device may include a size of the screen of the mobile device or a display resolution of the mobile device. The user interface process may be configured to retrieve the personalized user interface data that is associated with a remote server user account. At least one of the interactive display elements may enable selection of the remote server user account. According to embodiments, monitoring interactions of the user may include acquiring accelerometer data from the mobile device to determine characteristics data of the interactions of the user related to a dominant hand of the user.

According to embodiments, the interactions of the user may include touch of the display of the mobile device or tilt angle of the mobile device. Characteristics data of the user interactions may include an average pressure applied to the display while pressing the interactive elements, a duration of pressure applied to the display while pressing the interactive elements, and an area of the display to which pressure is applied while pressing the interactive elements. The render process may be configured to selectively increase dimensions of the interactive elements or position the interactive elements closer to one edge of the display.

According to various embodiments, a server may include a network interface configured to communicate with a mobile device; a processor; and memory configured to store instructions. The instructions may enable the processor to receive user data that is representative of characteristics of user interactions with the mobile device; accumulate the user data over a period of time; determine user interface settings based on the accumulated user data; and provide the user interface settings to the mobile device, in response to a request from the mobile device. The instructions may further enable the processor to associate the user data and the user interface settings with a user account. The server may be a remote server configured to provide self adjusting layout services to the mobile device.

According to various embodiments, a method may include requesting from a remote computing host, by a computing device, user interface settings based on accumulated user data uploaded to the remote computing host from one or more other computing devices. The method may include receiving from the remote computing host, by the computing device, the user interface settings. The method may include displaying a user interface on the computing device based on the user interface settings. Displaying the user interface may include adjusting a size of user interface elements based on the user interface settings. The user interface elements may include at least one of a graphical button, a graphical slide bar, or a graphical check box.

According to embodiments, the method may include receiving, by the computing device, user account information; and requesting from the remote computing host, by the computing device, the user interface settings associated with the user account information based on the received user account information.

According to various embodiments, at least one computer readable medium may include a number of instructions stored therein and configured to enable a remote computing host, when executed by a processor of the remote computing host, to receive user data associated with user interactions with a mobile device; accumulate the user data over a period of time; generate user interface settings for a user based on the accumulated user data; and transmit the user interface settings to one or more computing devices in response to a request for the user interface settings by the one or more computing devices. The instructions may be configured to enable the remote computing device to transmit the user interface setting after verifying an identity of the user. The user data may include one or more of touch pressure data, click speed data, finger size data, or dominant hand data. The one or more computing devices may include the mobile device. The one or more computing devices may include devices other than the mobile device.

According to various embodiments, each of the features described for each of the computer readable media, methods, and apparatus may be combined with other features of each of the computer readable media, methods, and apparatuses.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims.

What is claimed is:

1. At least one non-transitory computer-readable storage medium having a plurality of instructions stored therein that cause a first computing device, in response to execution by the first computing device, to:

monitor interactions with the first computing device by a user of the first computing device, wherein monitor includes monitor how the user holds or orients the first computing device when interacting with first one or more applications of the first computing device; and upload detected interactions or characteristic data of the detected interactions to a remote computing server to accumulate and merge the characteristic data of the detected interactions at the remote computing server with other characteristic data of other detected interactions at second one or more other computing devices while interacting with second one or more application of the second one or more computing devices, where other detected interactions include how the user holds or orients the second one or more computing devices when interacting with the second one or more applications of the second one or more computing devices, and to subsequent download the accumulated and merged characteristic data of the detected interactions or customizable user interface settings of a third application, differs from the first and second one or more applications, to a third computing device associated with the user, differ from the first and second one or more other computing devices, to provision a user interface of the third application on the third computing device, based at least in part on the downloaded characteristic data of the detected interactions or customizable user interface settings of the third application, wherein the customizable user interface settings of the third application are derived from the accumulated and merged characteristic data.

2. The at least one computer-readable storage medium of claim 1, wherein the plurality of instructions are to further cause the first computing device, in response to execution by the first computing device, to derive characteristic data from the detected interactions with the first one or more applications.

3. The at least one computer-readable storage medium of claim 1, wherein the first and third computing device are the same computing device and the first and third application are the same application.

4. At least one non-transitory computer readable storage medium having a plurality of instructions stored therein that cause a first computing device, in response to execution by the computing device, to:

download, from a remote computing server, accumulated and merged characteristic data of detected interactions of a user of the first computing device or customizable user interface settings of a first application of the first computing device, wherein the accumulated and merged characteristic data of detected interactions are either uploaded from second one or more computing devices, differs from the first computing device, or derived from detected interactions at the second one or more computing devices while the user interacts with second one or more applications of the second one or more computing devise, and uploaded from the second one or more computing devices, and the customizable user interface settings are derived from the accumulated and merged characteristic data, and wherein the detected interactions at the second one or more computing devices include how the user holds or orients the second one or more computing devices when interacting with the second one or more applications of the second one or more computing devices; and provide a user interface for the first application on the first computing device, based at least in part on the downloaded characteristic data of detected interactions or customizable user interface settings downloaded from the remote computing server.

5. The at least one computer-readable storage of claim 4, wherein the characteristic data of interactions downloaded from the remote computing server comprise merged characteristic data of interactions of the computing device and at least one other computing device associated with the user.

6. The computer readable medium of claim 4, wherein how the user holds or orients the second one or more computing devices includes tilt angles of the second one or more computing devices when interacting with the second one or more applications of the second one or more computing devices.

7. At least one non-transitory computer readable medium having a plurality of instructions stored therein that cause a mobile device, when executed by a processor of the mobile device, to:

execute a user interface process based on a self adaptive layout framework, wherein the user interface process includes operations to:
 monitor interactions of a user with a first application of the mobile device;
 upload detected interactions or characteristics data of the detected interactions to a remote server to accumulate and merge the characteristics data with characteristic data of other detected interactions at one or more other computing devices, differ from the mobile device, while the user interacts with second one or more applications, differ from the first application, at the one or more other computing devices, or generate derived customizable user interface settings to operate the first application at the mobile device, wherein the detected interactions with the first and second one or more applications include speed or pressure the user interacts with displays of the mobile device and the one or more other computing devices when the user interacts with interactive elements of the first and second one or more applications; and
 retrieve, from the remote server, personalized user interface data that is based on the accumulated and merged characteristics data or the derived customizable user interface settings; and execute a render process based on the self adaptive layout framework, wherein the render process is to adapt the interactive elements of the first application based on the personalized user interface data and based on display characteristics of the mobile device.

8. The computer readable medium of claim 7, wherein the user interface process is to further determine whether the self adaptive layout framework is active; and
 monitor the user interactions based on whether the self adaptive layout frame is active.

9. The computer readable medium of claim 7, wherein the render process is to further display the interactive elements of the first application based on the retrieved personalized user interface data when the mobile device is connected to the remote server, wherein the render process is to display the interactive elements of the first application based on stored user interface data located in memory of the mobile device when the mobile device is disconnected from the remote server.

10. The computer readable medium of claim 7, wherein the characteristics data of the detected interactions include dominant hand of the user or finger size.

11. The computer readable medium of claim 7, wherein display characteristics of the mobile device include a size of the screen of the mobile device or a display resolution of the mobile device.

12. The computer readable medium of claim 7, wherein the user interface process is to retrieve the personalized user interface data that is associated with a remote server user account.

13. The computer readable medium of claim 12, wherein at least one of the interactive display elements enables selection of the remote server user account.

14. The computer readable medium of claim 7, wherein detected interactions include:
 detected accelerometer data from the mobile device and the one or more other computing devices to determine characteristics data related to a dominant hand of the user.

15. The computer readable medium of claim 7, wherein characteristics data of the user interactions include an average pressure applied to the display while pressing the interactive elements of the first application, a duration of pressure applied to the display while pressing the interactive elements of the first application, and an area of the display to which pressure is applied while pressing the interactive elements of the first application.

16. The computer readable medium of claim 7, wherein to adapt the interactive elements of the first application includes to:
 position the interactive elements of the first application closer to one edge of the display of the mobile device, based on the personalized user interface data and based on display characteristics of the mobile device.

17. A server, comprising:

a network interface to communicate with a mobile device and one or more other computing devices;

a processor; and memory to store instructions that cause the server, in response to execution of the instruction by the processor, to:

receive user data that is representative of characteristics of user interactions with the mobile device and the one or more other computing devices, wherein the user data include speed or pressure the user interacts with displays of the mobile device and the one or more other computing devices when the user interacts with interactive elements of applications of the mobile device and the one or more other computing devices;

accumulate and merge the user data over a period of time;

determine user interface settings for an application of the mobile device, based on the accumulated and merged user data; and provide the user interface settings for the application of the mobile device to the mobile device, in response to a request from the mobile device.

18. The server of claim 17, wherein the instructions are to further cause the server to associate the user data and the user interface settings with a user account.

19. The server of claim 17, wherein the server is a remote server to provide self adjusting layout services to the mobile device.

20. A method, comprising:

requesting from a remote computing host, by a first computing device, user interface settings for a first application of the first computing device, determined based on accumulated and merged user data uploaded to the remote computing host from the first computing device and second one or more other computing devices, wherein the user data include speed or pressure the user interacts with displays of the first computing device and the second one or more other computing devices when the user interacts with interactive elements of applications the first computing device and the second one or more other computing devices;

receiving from the remote computing host, by the first computing device, the user interface settings for the first application; and displaying a user interface of the first application on the first computing device based on the user interface settings.

21. The method of claim 20, wherein said displaying the user interface includes adjusting positions of user interface elements based on the user interface settings, wherein the user interface elements include at least one of a graphical button, a graphical slide bar, or a graphical check box.

22. The method of claim 20, further comprising:

receiving, by the first computing device, user account information; and requesting from the remote computing host, by the first computing device, the user interface settings associated with the user account information based on the received user account information.

* * * * *